United States Patent [19]
Pommier

[11] Patent Number: 5,599,372
[45] Date of Patent: Feb. 4, 1997

[54] PROCESS FOR REMOVING METAL CONTAMINANTS FROM SOILS

[75] Inventor: Luis W. Pommier, Rancho Santa Margarita, Calif.

[73] Assignee: Earth Decontaminators, Inc., Irvine, Calif.

[21] Appl. No.: 54,937

[22] Filed: Apr. 26, 1993

Related U.S. Application Data

[63] Continuation-in-part of Ser. No. 748,107, Aug. 21, 1991, abandoned.

[51] Int. Cl.$^6$ .............................. C05G 3/04; A62D 3/00
[52] U.S. Cl. ................................ 71/1; 134/2; 588/236
[58] Field of Search ................................ 71/1, 903, 904, 71/DIG. 2; 588/236; 435/262, 262.5; 405/263; 134/2

[56] References Cited

U.S. PATENT DOCUMENTS 5,342,449   8/1994   Holbein et al. .............................. 134/2

OTHER PUBLICATIONS

"Innovative Electromembrane Process . . . Soils", Krishnon et al, pp. 1–21, Aug. 1, 1988.

*Primary Examiner*—Ferris Lander
*Attorney, Agent, or Firm*—Lyon & Lyon

[57] ABSTRACT

A multi-step process for treating soil that has become contaminated with heavy metals is disclosed. The process may be conducted on the site where contaminated soil is present and allows replacement of the original contaminated soil with decontaminated soil, thus avoiding the need to transport contaminated soil. The contaminated soil is separated and analyzed to determine which soil fractions contain metal contaminants, further processed to isolate the contaminants and treated with oxidizing agents. The contaminating metals are removed from the soil mixture by chelation. Decontaminated soil is replaced at the site and the metals that are removed from the soil are recovered and recycled.

11 Claims, 2 Drawing Sheets

PROCESS FOR REMOVING METAL CONTAMINANTS FROM SOILS

This application is a continuation-in-part of U.S. patent application No. 07/748,107 filed Aug. 21, 1991, and now abandoned.

The present invention relates to a multi-step physical and chemical process to remove metal contaminants from soil.

BACKGROUND

Contamination of soil by heavy metals is an environmental problem that plagues many areas of the country and is a growing problem throughout the industrialized nations.

Most frequently, the soil surrounding industrial sites such as metal finishing and plating operations and certain manufacturing processes has become contaminated by the accumulation of heavy metals. As scientists and policy makers have come to appreciate the severity of the hazard to living organisms posed by these metals, strict environmental regulations have been put into place that govern the disposal of these wastes.

Once an area of soil is contaminated, over time these contaminants may enter streams, lakes and sources of drinking water including underground wells. For this and other reasons, in addition to controlling polluting sources, it is important to take active steps to remove dangerous contaminants from the environment. Due to the severity of the risk, persons or businesses associated with a contaminated site often face the need for a process to remove contaminants from a site in order to comply with increasingly strict pollution standards.

Compliance with strict environmental regulations is an increasingly important aspect of waste clean-up. One difficulty that arises with some existing techniques is that the treatment processes may create by-products that themselves must be treated as hazardous wastes. Ideally, an environmental remediation process would enable the user, upon completion of the process, to certify that an environmental hazard had been treated in such a way that, not only is the threat to life removed, but also that the site may be certified to be in compliance with regulations. In such case, a distinct advantage would be offered by a process that could establish that the hazardous substance has been rendered non-hazardous without producing hazardous by-products.

Also, under the laws of many states, a party who owns, leases or who once owned or leased a parcel of land may incur substantial civil and criminal liability if it is discovered that the land contains hazardous wastes. In many situations, a party, whether in or out of possession of the land, may be required to provide extensive remedial measures to remove hazardous wastes from a site even though contamination of a site is caused by materials such as heavy metals whose toxicity was unrealized or whose disposal went unregulated for decades. Furthermore, the most recently enacted environmental regulations strictly limit the quantity of metal contaminants that may be found in a soil sample and may require a party to demonstrate that the quantity of a contaminant found in a soil sample is near the natural background level. Therefore, treatment processes need to be able to offer almost complete removal of contaminants from a site before the site is considered environmentally safe.

One current practice used to clean contaminated sites involves simple removal of the contaminated soil and transfer to a certified waste disposal site. At best, this is only a partial remedy because, essentially, the contaminants are simply moved from one place to another. Additionally, soil that contains contaminants may be classified hazardous waste and therefore be subject to restrictions in transportation.

Under current law, substantial legal liability may be incurred by a party who ships toxic waste. For example, the party who ships the waste may be held liable for accidents that occur in transit and can be held vicariously responsible for the actions of unscrupulous transporters. Moreover, the physical removal, transport, and disposal of contaminated soil is dangerous to workers and can cost as much as approximately $300 per ton. Furthermore, in the near future, recent legislation has been considered that may further limit or prohibit transportation of contaminated soils to disposal sites. Thus, the need for a process to remove contaminants from soil without transporting the contaminated soil is keenly felt. Ideally, soils that are contaminated with heavy metals would be treated on-site and the bulk soil would be decontaminated and returned to the ground so as to avoid relocating large volumes of contaminated soils or having to import quantities of clean soil to make up for the quantity of hazardous soil removed.

As an alternative to physical removal of soil containing metal contaminants, soil can be chemically treated with strong acids or caustic agents to attempt to dissolve the metal contaminants. Although this method may be less expensive on a "per site" basis than physically transporting contaminated soil to a disposal site, current chemical treatment processes require construction of a specially designed treatment plant whose cost can run into the millions. More importantly from the environmental viewpoint, treatment with harsh chemicals dissolves other soil components and ignores the valuable organic properties of soil that enable soil to act as a growth medium for plants and a habitat for animals.

Those skilled in the art appreciate that decontamination of soil presents unique problems because, upon treatment to remove toxic materials, the soil should be preserved as an organic medium. For this reason, chemical reactions or techniques that might otherwise be used to treat contaminating metals would be less desirable in soil applications because the soil itself would be destroyed or further contaminated by the treatment. Despite the known drawbacks, such processes are widely used today even though they may destroy the valuable biological characteristics of the soil or actually dissolve the components of the soil entirely. Furthermore, the residues and byproducts of such chemical treatment processes could be considered hazardous wastes under state or federal regulations.

Currently, a variety of techniques exist that are capable of treating heavy metal contaminants in soil. For example, U.S. Pat. No. 5,037,240 to Sherman et al. discloses a method for introducing chemicals into soil containing any type of contaminant by sinking wick drains on the down-side of the underground water flow or directly into a contaminated water table. Using the wick drains, one can introduce a variety of remedial-treatment agents, including bacterial cultures, according to the type of contamination found. This method uses wick drains to reach the contaminants in situ and accordingly does not involve removal of soil from a site. Although this method allows one to introduce chemicals or agents to treat contaminants, unless the contaminants are in solution or are accessible to a liquid based treatment, the contaminants will not be contacted by the treating solution and will remain in the ground. Furthermore, all in situ techniques suffer from the drawback that when liquid cleansing solutions are placed into the earth, they have a tendency to disseminate unevenly. Small differences in the permeability of regions of underground soil can cause "channeling" of the treating agents thus leaving contaminated portions of a site untreated. Still further, an important problem with in situ techniques arises where a party must under government regulations certify that a site has been decontaminated to background levels. It would be extremely difficult, if not impossible, to certify that a site had been decontaminated to any certain degree. Lastly, the advantages derived from the ability to treat heavy metal contaminants by sequential treatments with different chemical agents is obviously difficult in any in-situ method.

A variety of techniques that attempt to segregate or partially isolate a contaminant are known to those skilled in the art. For example, soil screening, flotation, and other techniques are known to attempt to separate undesired components from a mixture. Also, chemical techniques for removing metals from solutions are known. For example, chelating agents are a class of molecules known to bind metal molecules and can be used to form complexes with metals in solution. Also, it is generally recognized that certain metals may be removed from an aqueous solution by electrochemical techniques.

A paper by E. Radha Krishnan, P.E. and William F. Kemner entitled "Innovative Electromembrane Process for Recovery of Lead from Contaminated Soils" discloses an electromembrane reactor that uses electric current to remove a single metal lead from a solution by electro-deposition. The preliminary steps of the process involve screening and classification, chelation of lead using EDTA, and a dewatering step, before placing a solution in an electromembrane reactor with addition of disodium carbonate for treatment. This process avoids the use of strong acids but suffers from several disadvantages that are overcome by the process of this invention.

First, as stated in the paper, pH is a very important process condition that may vary from site to site and must be controlled. Second, the electrodeposition process requires a large volume of water for the cells to function and to maintain a proper chemical balance. As the authors note, water from the electrodeposition step must be treated as a waste. The problems this causes appear to be substantial because the electrodeposition process requires a continuous inflow of water to maintain the chemical balance in the electrolyte in the electromembrane reactor. Third, the electrodeposition process is inherently slow, requires an entire installation of electrolytic cells, and may be less efficient when a variety of metals is present in a solution. Fourth, electrodeposition processes have a limit on the concentration of metals that can be removed from a solution. In other words, an electrodeposition-based process will always leave some dissolved metals remaining in solution and thus may not be capable to remove metal contaminants to background levels. Ultimately, the principal disadvantages of electrodeposition are practical ones—the need for large volumes of water and the need to transport electrodeposition reactors and the creation of by-products, particularly in the form of waste water, that are classified and must be treated as hazardous wastes.

To be most effective, a process would render the hazardous metal contaminants in soil non-hazardous by recovery and recycling and would accomplish the main goal of the environmental specialist which is to return a contaminated site to as near as possible its original condition without the practical problems caused by generating additional hazardous substances.

In light of the foregoing, it is easily appreciated that an ever-increasing need exists for an economical, portable, self-contained process that enables one to remove metal contaminants from soil, to measure the levels of contaminants in a quantity of soil to insure compliance with environmental standards, and to allow the contaminating metals to be recovered and recycled in their purified form as valuable materials. Moreover, it would be advantageous to provide a process that avoided the need to process water waste and that avoided the need to transport contaminated soil for disposal and replace contaminated soil with fresh soil. Furthermore, an ideal decontaminating chemical treatment would leave the organic quality of the soil intact.

An additional desirable feature in an environmental remediation process would be the ability to easily transport to the site at which the contamination is discovered all the equipment and materials necessary to perform the process. Also, an ideal process would be, to the extent possible, self-contained thereby requiring a minimum of equipment and material. In other words, a process that required large quantities of water or produced large quantities of waste water or other by-products would be less desirable for sites where sources of water or disposable facilities are limited or for sites that are geographically remote.

BRIEF DESCRIPTION OF THE INVENTION

This invention is a process where the heavy metal contaminants in a contaminated soil fragment are separated from the bulk soil composition, concentrated by known separation techniques described herein, exposed to an oxidizing agent, subsequently exposed to the chelating agent ethylenediaminetetraacetic acid [EDTA] and treated to regenerate the EDTA and to precipitate the metals to allow recovery for recycling. Thus, the soil is decontaminated and rendered non-hazardous and the metals which once were a contaminant are recycled for productive use. Analysis of soils treated with the process of this invention shows that a greater quantity of metal contaminants are removed from a wider variety of soils than with other methods generally known.

Several practical advantages are derived from the process disclosed herein. First, the integrity of the soil is preserved which enables replacement of contaminated soil with the same soil following decontamination. Second, this process enables removal of greater quantities of contaminating metals from a wider variety of soils than existing processes. Third, the metals that contaminated the soil are separated and recovered so that they can be recycled and put to a beneficial, non-polluting use. Fourth, the process does not produce any significant by-products such as acids or other compounds that are classified as toxic wastes and that must be treated or disposed at high cost. Water used in process is recycled back into the process as the process is performed. Significantly, at the conclusion of the process, the discard water is sufficiently free of contaminants that it may be disposed in a municipal sewer system. Fifth, the process requires a relatively small volume of water compared to existing processes and, thus, conserves water and is comparatively easy and practical to set-up and perform. Sixth, the process is relatively rapid, thus enabling removal of a substantial quantity of several species of metal contaminants in a short period of time. Finally, this process is practical and economical in terms of both equipment and materials.

BRIEF DESCRIPTION OF DRAWING

The drawing is a flow chart of the process that is the subject matter of this invention. Major process steps are enclosed within double-outlined boxes.

DETAILED DESCRIPTION OF THE INVENTION

Figure 1A:
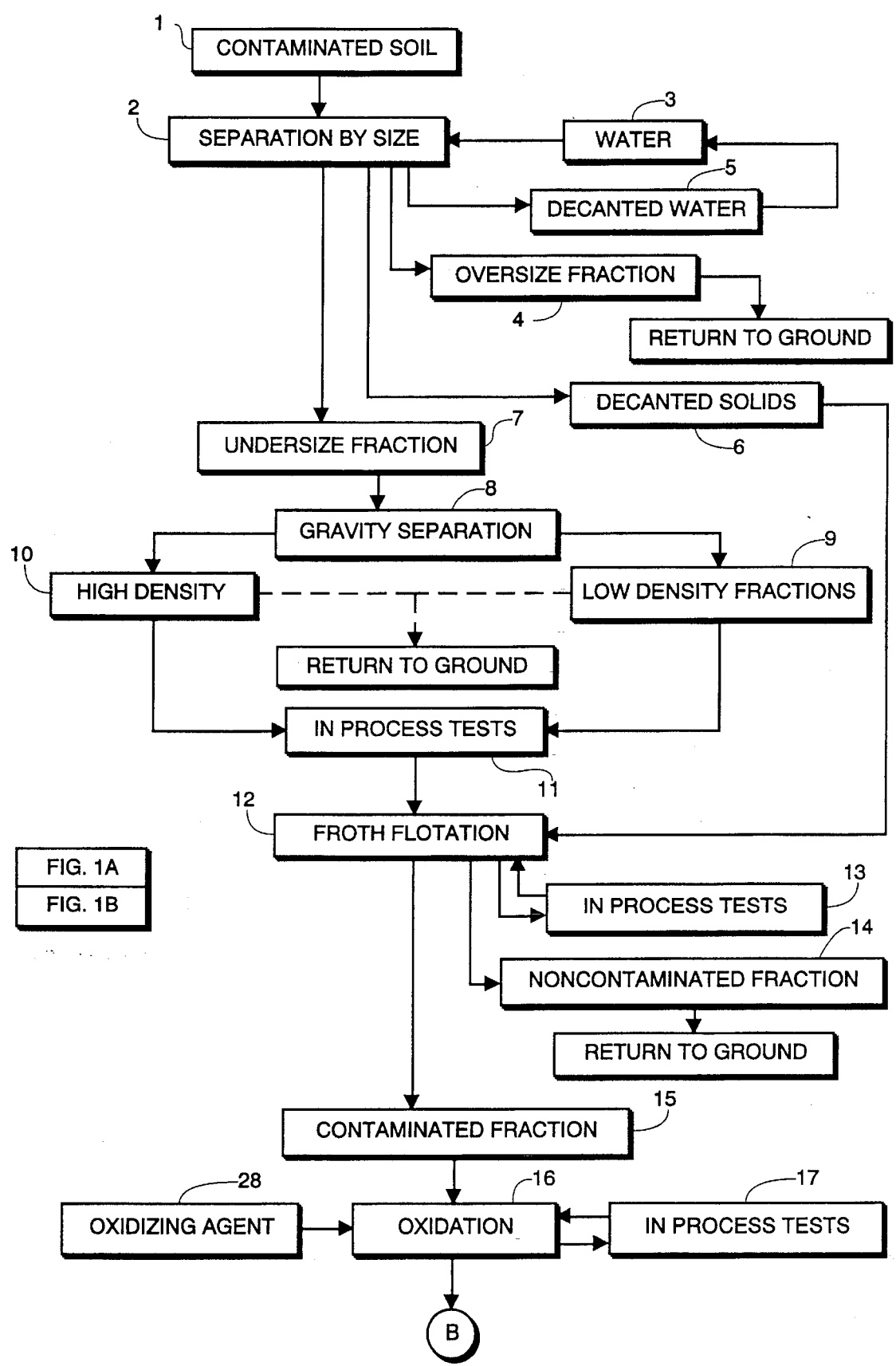
Figure 1B:
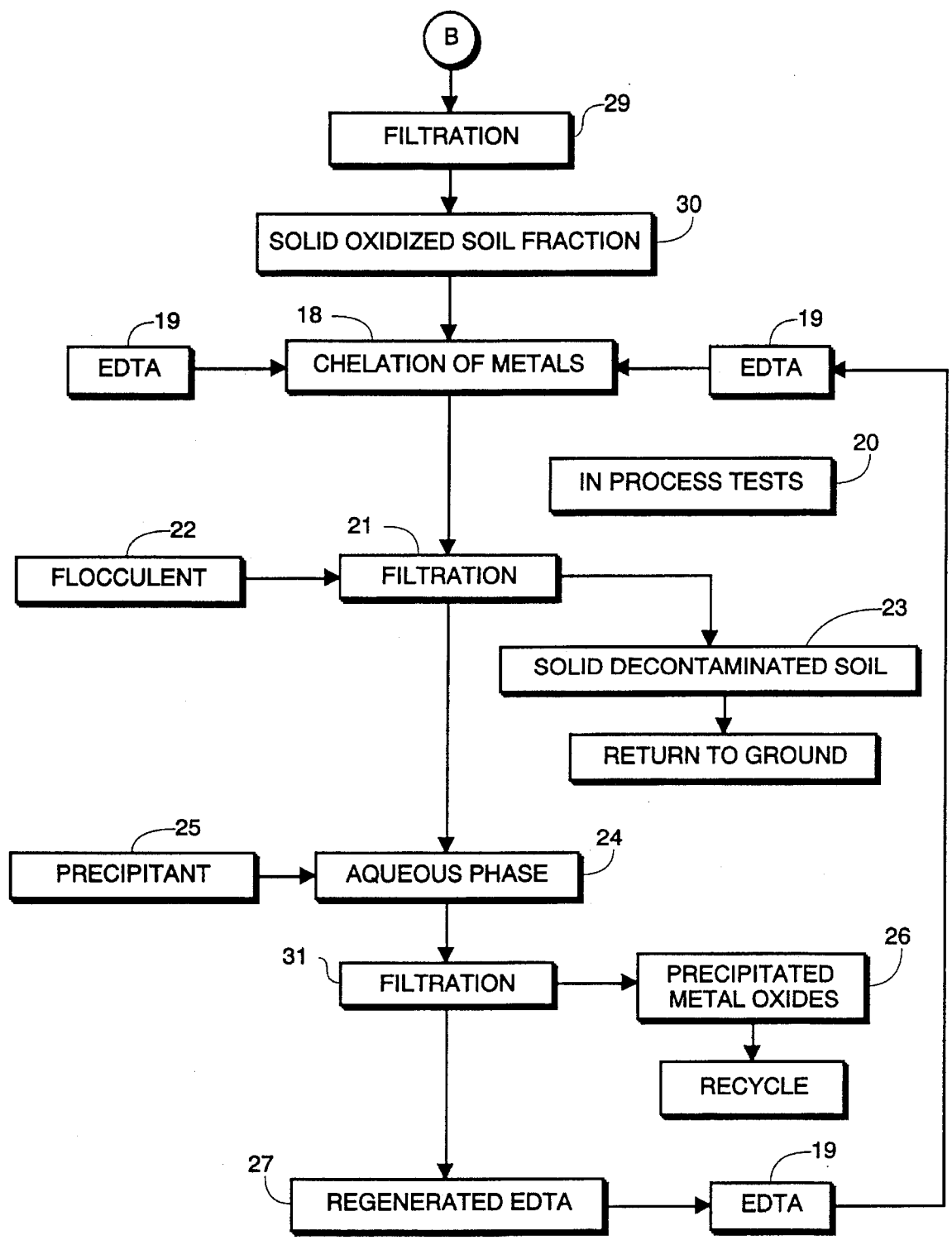

The invention will be more readily understood by reference to the accompanying drawing which shows the steps of the process of the invention and generally characterizes the individual components of the soil composition as they are decontaminated. The soil composition that is removed from the site may contain soil and other components such as stone, non-metallic contaminants and other debris. Also, the water content of the site may vary. For this reason, the term "soil composition" is used to describe the composite and materials, including soil that is removed from the earth to be decontaminated of heavy metals.

To facilitate efficient processing of the portion of the soil composition with the highest concentration of metal contaminants, a metal-contaminated quantity of soil composition i is removed from the earth and separated into a first fraction that is free of metal contaminants and a second fraction that contains the metal contaminants that are treated and recovered by process described below. Thus, a non-contaminated soil fraction separated from the soil composition by separating out several portions of soil based on the size of the individual soil particles determining the size at which contamination is found, and returning an uncontaminated first fraction to the ground.

Generally, one may determine a range of size of the individual soil particles in the soil composition, above which, the soil composition is uncontaminated. In order to determine the size of particles at which the size separation 2 between contaminated and non-contaminated soil particles may be made, the following test is performed in the laboratory. A representative sample of the soil is physically separated into several fractions according to size using sieves of different sizes, generally ranging from ½ inch to 1/32 inch. A sample from each size fraction is submitted to routine chemical analysis to determine whether a soil fraction containing particles of a particular size contains metal contaminants. It has been found in practice that, generally, soil fractions containing particles larger than 1/8 inch are less likely to contain hazardous metals and soil fractions containing particles smaller than 1/8 inch are more likely to contain hazardous metals.

Size separation step 2 is achieved using ordinary vibratory screens. Typically, once a desired sieve size is selected by determining a particle size above which contamination is not detected, the vibratory screens and sieves are used to physically separate the soil composition into an "undersize" soil fraction that contains contaminants and an "oversize" fraction that does not contain contaminants. Apparatus to perform this step are readily available in the market from manufacturers of mining equipment, such as Denver Equipment Co. During the size separation step 2, water 3 is sprayed onto the soil fractions being separated to ensure that all the particles which are removed from the contaminated soil are free of fine dusts which may also carry contaminants. The wash water 5 is decanted and reused to wash new soil. The decanted solids 6 are mixed with the contaminated soil fraction and submitted to the remainder of the decontamination process as described below.

Referring again to the accompanied drawing, having been confirmed by in-process tests to be free of metal contaminants, the uncontaminated oversize fraction 4 is returned to the earth without further processing.

Before chemical treatment begins it may be possible to further isolate the metal contaminants from the soil composition using additional separation techniques. To determine whether a gravity separation step would be advantageous, separate fractions of low and high density particles in the undersize soil fraction 7, are submitted to gravity separation step 8 using a laboratory-size shaking table which separates a low density fraction 9 from a high density fraction 10. In practice, this separation is achieved using conventional jigs or shaking tables such as those manufactured by Denver Equipment Co. Each fraction 9 and 10 is analyzed by in-process test 11 to determine if either of the fractions is non-hazardous. In-process test 11 may be one of any number of well-known, and often commercially available, simple chemical tests to determine whether contaminating metals are present.

If, based on the results of in-process test 11, the gravity separation step 8 successfully further separates undersize fraction 7 into a contaminated fraction and non-contaminated fraction by demonstrating that metal contaminants are found in a determined density range, only the hazardous fraction is processed by froth flotation 12. If either the low density 9 or high density be fractions is determined to be uncontaminated by in-process test 11, it may be returned to the ground as indicated by the dotted line in the accompanying drawing. If gravity separation 8 did not cause a non-contaminated fraction to be separated, the entire undersize fraction 7 is submitted to froth floatation 12.

In concert with the froth flotation step 12, in-process tests 13 may be performed in the laboratory to select an optimal froth floatation agent for a particular soil composition. In general, a chemical like oleic acid or other such agent which differentially adsorbs the hazardous or non-hazardous fraction is an effective froth flotation agent. To conduct the in-process test 13, individual soil samples are mixed with one of several froth floatation agents and the one that provides the highest degree of separation between contaminated and non-contaminated fractions is used. Once the proper agent is selected, the froth flotation step 12 is performed in a suitable vessel of a type that is readily available. With the aid of a froth apparatus, air bubbles are created. Soil particles containing the contaminating metals are bound to the froth floatation agent and float to the surface where they are removed from the mixture by a standard froth remover mechanism.

Once a contaminated fraction 15 is separated by the above process, a non-contaminated fraction 14 may be returned to the earth and the contaminated fraction 15 is processed further to remove the metal contaminants. Removal of metal contaminants from contaminated fraction 15 is accomplished by transferring contaminated soil fraction 15 to a large vessel such as a tank or the like wherein oxidation step 16 is performed.

Oxidation 16 is achieved by the introduction of an aqueous solution of an oxidizing agent 28 such as hydrogen peroxide. If, as is preferred, an aqueous solution of hydrogen peroxide is used, the hydrogen peroxide concentration in water is not required to be greater than 5%. The oxidizing agent 28 and the contaminated soil fraction 15 are combined in a standard mixer suitable for use with soil fractions. These mixers are sold by well-known manufacturers of mining equipment such as the Denver Equipment Co. The mixture of soil and hydrogen peroxide solution is mixed vigorously for a period which generally need not exceed 30 minutes.

The optimum agitation time required may be as short as 5 minutes and is a function of the type of soil and the degree of oxidation of the contaminating metals. A process test 17 may be used to determine the optimal time of agitation for a particular soil fraction in order to maximize efficiency of the overall process by reducing the time for each step to its minimum effective time. In-process test 17 is a simple laboratory test comprising obtaining, approximately every 5 minutes, a sample of the soil in the process of oxidation 16, and submitting the sample to a standard laboratory x-ray diffraction analysis to determine the extent to which each contaminating metal species has been oxidized during the oxidation step 16 of the process.

When oxidation 8 is complete, the mixture is filtered 29 to separate the soil fraction containing the oxidized metals from the aqueous solution. Following the oxidation step 16, a filtration step 29 achieves isolation of a solid oxidized soil fraction 30 from the aqueous solution.

For the filtration steps 21, 29, and 31 that are performed in this process, one can optimize the filtration process by selecting a type and size of filter in accordance with the soil type. Filtration step 29 takes place in an apparatus which is selected using the following criteria specifically for the characteristics of the soil fraction to be filtered. Soils with a large proportion of very fine particles are filtered using a fine filter cloth. Pressure filters are selected for soils containing a larger proportion of fine soil particles. Vacuum filters may be used for more sandy soils which filter readily. Those skilled in the art appreciate that efficient filtering conditions are dependent on the physical characteristics of the composition of soil particles being removed from solution. Generally, most soils contain a large fraction of very fine particles, thus, a filter press is generally used. However, vacuum filters may be selected if the soil contains a very small fraction of finer particles. Once the type of filter is selected, an appropriate filter cloth is chosen. This filter cloth is selected according to the size of the particles which must be retained with the rest of the soil. Accordingly, very fine soil will require a filter cloth of fine size, sandy soils require coarser filter cloth. Similarly, as with filtration of any substance, the finer the filtrate the higher the pressure required. Thus, finer soil particles require higher filter pressures, up to 120 pounds per square inch (psi) while coarser soil particles typically require much lower pressures of about 20 psi.

Once the aqueous solution is removed by filtration 29, the remaining solids form a cake which is removed from the filter apparatus and transferred into a container such as a tank or the like to remove the contaminating metals from the solid oxidized soil fraction 30.

In the extraction of metals step 18, an aqueous solution of the acid form of EDTA is added to solid oxidized soil fraction 30. EDTA is capable of binding the oxidized metals allowing isolation of the contaminating metals from a wide range of soil types and is readily available at competitive prices. The pH of the process is the pH of EDTA in solution but is not a critical process parameter.

The concentration of EDTA in solution is determined by the stoichiometry of the system. Knowing the chemical formula of EDTA, one skilled in the art can determine what concentration of EDTA will be required to bind to the particular metal that is contaminating the site. For example, the chemical formula of EDTA indicates that it possesses two active free valences and that if the contaminant metal to be extracted is oxidized to a bivalent state, one molecule of EDTA will chelate one atom of the metal contaminant.

In order to establish the optimum degree of reaction, it has been found experimentally that an excess of up to 100% of EDTA enables improved isolation and extraction of the metals. Accordingly, to increase the efficiency of the process, and to minimize the cost, the performance of a series of tests to determine the optimum concentration of the EDTA solution 19 may be performed. For example, a number of soil samples may be individually mixed with 60%, 80%, 100%, 120% and 140% of the concentration of EDTA determined to be needed to remove 100% of the metals. The results of such a test will demonstrate the effectiveness of the reaction for a particular soil sample and will dictate the concentration of EDTA that should be used to reduce the amount of metals to a point that is deemed safe by applicable environmental regulation. It has been discovered that the step of oxidation 16 of the metals in a soil fraction, prior to removal of metals with chelating agent EDTA 19, allows removal of substantial quantity of contaminating metals from a wider variety of soils. The volume of a mixture containing the oxidized soil fraction 30 and EDTA solution 19 is adjusted so that the solid soil media comprises 25–40% by volume of the mixture. The EDTA solution is stirred or agitated for a period between 15 minutes and 2 hours. The precise length of time required to effectively react the metals will depend on the physical characteristics of the soil, such as the size or porosity, and will vary depending on which metals are to be removed. In general, the more fine and more porous the soil particles, the longer the agitation time that is required.

Again, efficiency of the overall process may be enhanced by determining the minimum time in which this step is completed. The precise time required for complete reaction for a particular mixture may be determined by in-process test 20. In process test 20 is easily performed in the laboratory using standard procedures. After 5 minutes of agitation, a sample of the mixture is obtained and analyzed by X-ray diffraction to determine the concentration of any remaining unreacted metals of interest. This analysis is repeated every 5 minutes. Once the results of in-process test 20 yield repeatable results showing the concentration of hazardous metals to be in an acceptable range, the necessary degree of reaction has been achieved.

After the slurry mixture is stirred or agitated for the time determined by in-process test 20 to satisfactorily bind the metals with the EDTA, the mixture is allowed to settle. When settling is complete, a 0.5% to 1.5% solution of a cationic poliquarternary amine available in the market is added as a flocculent 22. After addition of the flocculent, the mixture is filtered 31 in a pressure filter at approximately 50 psi using a filter cloth with a mesh of approximately 50 microns. The solid filtrate thus collected is washed with an aqueous solution of EDTA solution 19. This filtration step 31 will yield decontaminated soil 23 as the solid filtrate while the hazardous metals, which remain dissolved in solution, are collected in an aqueous phase 24.

To recover the metals from aqueous phase 24, a precipitant 25 is added to aqueous phase 24 as it is being stirred in a tank at room temperature. The precipitant 25 used should be one of a class of mild organic oxidants known to react with EDTA in the manner described herein. These precipitants are well known to those of ordinary skill in the art and are readily available from many chemical companies including Environmental Technologies, Inc. in Florida. In particular, it has been found that organic oxidizers like Thio-red and SP-plus, manufactured by ETUS Inc. are effective in precipitating the metals out of the aqueous solution. These compounds precipitate the metal oxides 26 and regenerate the chelating agent EDTA 27 from the aqueous phase 24.

The optimum concentration of the precipitant 25 to be added depends on the concentration of the metals in solution. One molecule of precipitant is used for every atom of metal in solution. The higher the concentration of metals in the aqueous phase 24 as determined by atomic absorption techniques, the higher the concentration of the precipitant 25 that should be added. Care must be exercised to use less precipitant 25 than would remove 100% of the metals in the solution. Approximately 20% of the metals which were originally in aqueous phase 24 should be allowed to remain unprecipitated to avoid the presence of precipitated metal oxides 26 in the regenerated EDTA acid 27. The regenerated EDTA acid 27 is then recycled into the above process as EDTA solution 19 after having been adjusted to an appropriate concentration. The metal oxides 26 thus precipitated are filtered 31 in a diatomaceous earth filter. Therefore, by use of the above process the original contaminated soil composition 1 is decontaminated and the metals can be recycled and put to a non-polluting use. When all the contaminated soil is in particular site is treated by this process, the site is then tested to insure that it is sufficiently remediated to be classified as non-toxic.

It will be appreciated by those skilled in the art that the process parameters of the method disclosed herein may and should be adjusted depending on the particular metals in the soil and depending on the amount of each metal that may be allowed to safely remain in the soil. Therefore, a preferred embodiment of the invention involves practicing the basic method described below in conjunction with in-process tests to allow one to certify that a required level of remedial treatment has been accomplished. For example, a soil sample may contain lead contaminants whose concentration must be reduced one hundred fold and chromium contaminants whose concentration must be reduced two fold. Also, the contaminants may be concentrated in different individual soil fractions within the soil mixture. Under these circumstances, the process that is this invention is most efficiently and effectively practiced in concurrence with the in-process testing described herein. These in-process tests are performed on-site to guide one skilled in the art in selecting appropriate reagents, reaction times, pressures, and other process parameters within the spirit of this invention. It has been observed that the effectiveness of the available methods for soil treatment varies greatly depending on the soil type that is attempted to be decontaminated. Certain metals have been found to be very difficult to remove from certain soil types and one may desire to alter this process slightly within the parameters described herein, to enhance the effectiveness of this process for different soil types. Finally, it may be the case that the process disclosed herein will be performed with the knowledge that the metal contaminants in the soil need only be reduced to a certain measured level to be nonhazardous. One skilled in the art may thus tailor the specific parameters of this process as the circumstances dictate.

It will be appreciated that the instant specification is set forth to be instructive—not limiting. Various modifications and changes may be made without departing from the spirit and scope of the present invention.

I claim:

1. A process for removing metal contaminants from soil comprising the steps of removing from the earth a soil composition containing metal contaminants, separating a first fraction of soil that is free of metal contaminants from said soil composition by a method selected from the group consisting of particle size, particle density, or froth flotation, or mixtures thereof and retaining for further treatment a second fraction that contains metal contaminants, oxidizing the metal contaminants contained in the second fraction of soil by exposing the second fraction to hydrogen peroxide, reacting the oxidized metal contaminants with an aqueous solution of the acid form of ethylenediaminetetraacetic acid, and adding a precipitant to the solution containing the chelated metal contaminants.

2. A method according to claim 1 further comprising a step following the addition of a precipitant to the solution containing the metal contaminants, said step comprising adding an organic oxidizer.

3. A method for removing metal contaminants from soil comprising:

separating a sample of soil into fractions of differing sizes by a method selected from the group consisting of particle size, particle density, or froth flotation, or mixtures thereof, analyzing the fractions to determine which fractions contain metal contaminants, returning non-contaminated fractions to the earth, further separating the contaminated fraction into a metal-contaminated and a non-metal-contaminated fraction by a method selected from the group consisting of particle size, particle density, or froth floatation, or mixtures thereof, mixing the metal contaminated fraction in hydrogen peroxide, mixing the oxidized metal contaminated fraction with an aqueous solution of the acid form of ethylenediamine tetraacetic acid, adding a precipitant to form a precipitate containing the metal contaminants, isolating the precipitate from the solution.

4. A method according to claim 3 wherein the precipitates are isolated from the solution by filtration.

5. The method of claim 3 wherein the precipitant is an organic oxidizer.

6. A method for simultaneously removing several metal contaminants from soil comprising the steps of:

removing a soil composition from the earth, separating the soil composition into several soil fractions according to the difference in size of individual soil particles, analyzing the fractions to determine a maximum size of soil particles in which contaminants are found, separating the soil composition into at least one soil undersize fraction and at least one oversize soil fraction based on the maximum size of soil particles in which contaminants are found, returning the oversized soil fractions to the earth, separating the undersized fractions in which contaminants are found into a contaminated fraction and a non-contaminated fraction by at least one of density separation or froth floatation, mixing the contaminated fraction with hydrogen peroxide to oxidize the metal contaminants, filtering the aqueous solution to obtain a solid oxidized soil fraction, reacting the oxidized metal contaminants to form a reaction product comprising a solution of the acid form of ethylenediamine tetraacetic acid and the solid oxidized soil fraction, separating a solid decontaminated soil fraction by adding a flocculent and passing the reaction product through a filter, returning the solid decontaminated soil fraction to the earth, recovering the metal contaminants from the reaction product by adding a precipitant to form a precipitate containing the metal contaminants, isolating the precipitate from solution by passing the reaction product through a filter.

7. A process for removing metal contaminants from soil comprising the steps of removing from the earth a soil composition containing metal contaminants, separating a first fraction of soil that is free of metal contaminants from said soil composition by a method selected from the group consisting of particle size, particle density, or froth flotation, or mixtures thereof and retaining for further treatment a second fraction that contains metal contaminants, oxidizing the heavy metal contaminants contained in the second fraction of soil by mixing the second fraction with an aqueous solution of an oxidizing agent at a concentration and for a sufficient time to increase the valence state of the heavy metal contaminant to an extent such that said contaminant is able to be reacted with the acid form of ethylenediaminetetraacetic acid, reacting the oxidized metal contaminants with an aqueous solution of the acid form of ethylenediaminetetraacetic acid, and adding a precipitant to the solution containing the chelated metal contaminants.

8. A method for removing metal contaminants from soil comprising:

separating a sample of soil into fractions of differing sizes by a method selected from the group consisting of particle size, particle density, or froth flotation, or mixtures thereof, analyzing the fractions to determine which fractions contain metal contaminants, returning non-contaminated fractions to the earth, further separating the contaminated fraction into a metal-contaminated and a non-metal-contaminated fraction by a method selected from the group consisting of particle size, particle density, or froth flotation, or mixtures thereof, oxidizing the heavy metal contaminants contained in the metal-contaminated fraction of soil by mixing the metal-contaminated fraction with an aqueous solution of an oxidizing agent at a concentration and for a sufficient time to increase the valence state of the heavy metal contaminant to an extent such that said contaminant is able to be reacted with the acid form of ethylenediaminetetraacetic acid, mixing the oxidized metal contaminated fractions with an aqueous solution of the acid form of ethylenediamine tetraacetic acid, adding a precipitant to form a precipitate containing the metal contaminants, isolating the precipitate from the solution.

9. A method for simultaneously removing several metal contaminants from soil comprising the steps of:

removing a soil composition from the earth, separating the soil composition into several soil fractions according to the difference in size of individual soil particles, analyzing the fractions to determine a maximum size of soil particles in which contaminants are found, separating the soil composition into at least one soil undersize fraction and at least one oversize soil fraction based on the maximum size of soil particles in which contaminants are found, returning the oversized soil fractions to the earth, separating the undersized fractions in which contaminants are found into a contaminated fraction and a non-contaminated fraction by at least one of density separation or froth floatation, oxidizing the heavy metal contaminants contained in the second fraction of soil by mixing the second fraction with an aqueous solution of an oxidizing agent at a concentration and for a sufficient time to increase the valence state of the heavy metal contaminant to an extent such that said contaminant is able to be reacted with the acid form of ethylenediaminetetraacetic acid, filtering the aqueous solution to obtain a solid oxidized soil fraction, reacting the oxidized metal contaminants to form a reaction product comprising a solution of the acid form of ethylenediamine tetraacetic acid and the solid oxidized soil fraction, separating a solid decontaminated soil fraction by adding a flocculent and passing the reaction product through a filter, returning the solid decontaminated soil fraction to the earth, recovering the metal contaminants from the reaction product by adding a precipitant to form a precipitate containing the metal contaminants, isolating the precipitate from solution by passing the reaction product through a filter.

10. A method according to claim 9 wherein the precipitates are isolated from the solution by filtration.

11. The method of claim 10 wherein the precipitant is an organic oxidizer.

* * * * *